April 16, 1946.  J. F. MINTKEN  2,398,385
ROTARY ROD WEEDER
Filed Feb. 12, 1945

Inventor
John F. Mintken
By
Attorney

Patented Apr. 16, 1946

2,398,385

UNITED STATES PATENT OFFICE 2,398,385

ROTARY ROD WEEDER

John F. Mintken, Dalton, Nebr.

Application February 12, 1945, Serial No. 577,447

9 Claims. (Cl. 97—42)

The invention is directed to an improvement in rotary rod weeders, and is more particularly concerned with constructing the drive rods, leading from the operating means to and for operating the weeder rod in a particular manner to insure against clogging of the weeder in operation.

The improved drive rod is constructed to pick up the trash and dirt during weeder operation, to directly discharge the dirt and heavier particles by gravity and direct the lighter portions of material upwardly and outwardly from the weeder rod to maintain such rod clear of obstruction, tending to reduce its effectiveness.

The primary object is the provision of the drive rod in the form of a general spiral from end to end, with such spirals varying in diameter and length from the weeder rod to the driving means, to insure lifting and discharge of the refuse picked up and direct it from the weeder rod.

A further object of the invention is the provision of a substantially spiral-form drive rod with the spiral completely open to insure gravital discharge of the heavier particles of the refuse, as for example the dirt, while at the same time lifting the straw and lighter refuse upwardly and backwardly for outward discharge.

The invention is illustrated in the accompanying drawing, in which.

Figure 1:
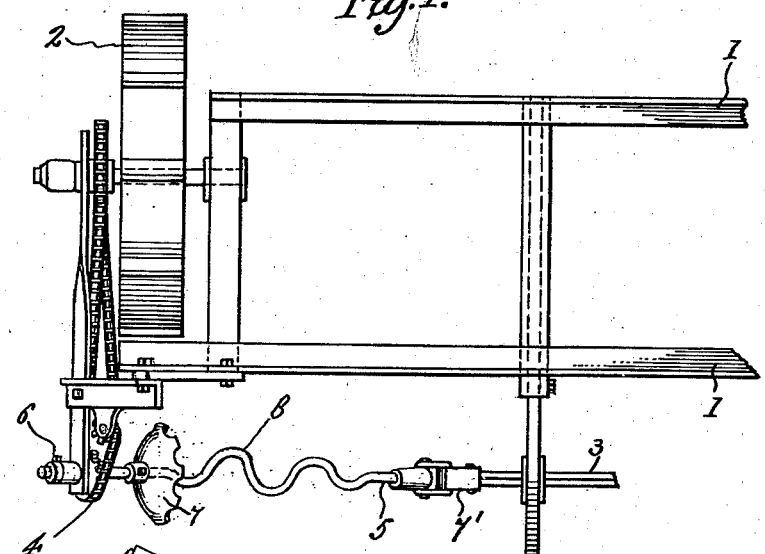
Fig. 1 is a broken plan view of a weeder to illustrate the application and form of the improved drive shaft.
Figure 2:
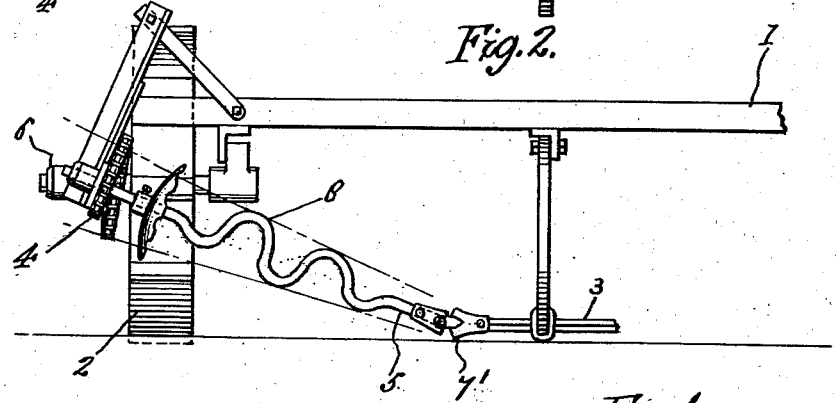
Fig. 2 is a rear view of the same.
Figure 3:
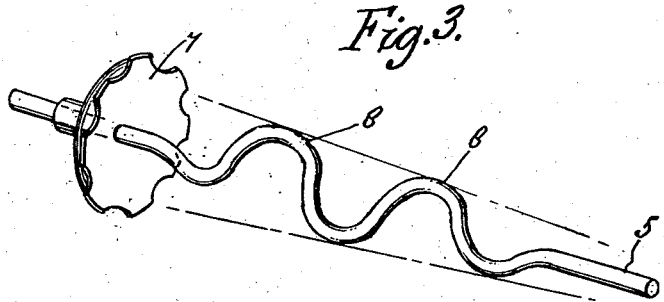
Fig. 3 is a perspective view of the improved drive shaft.
Figure 4:
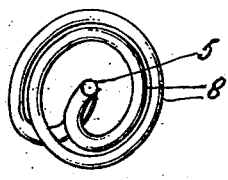
Fig. 4 is an end view of the drive shaft.

The improved drive shaft is here shown in use with a conventional type of weeder, in which 1 is the general frame, 2 the ground drive wheels, 3 the weeder rod, 4 the sprocket driven from the ground wheels, and between which sprocket, on each side of the machine, and the respective ends of the weeder rod 3, the improved drive shaft is arranged and connected for driving the weeder rod. The showing of the weeder is more or less conventional, and further detailed description thereof is not deemed necessary, it being understood that the improved drive shaft may be used with practically any and all types of rod weeders.

As the weeder rotates below the surface of the ground in a direction opposite to the travel of the machine, the drive shafts at the respective ends of the weeder rod necessarily slope or incline bodily downwardly and forwardly between the drive sprocket 4 and the weeder rod 3, and in its rotation to drive the weeder rod picks up more or less dirt, straw and other weeds, which ordinarily would collect on the drive shaft and reach and collect on the weeder rod to materially reduce its efficiency.

The improved drive shaft is formed of a round rod 5, of substantially uniform diameter from end to end and provided with key connection or other means 6 for removably fixing its upper end in relation to the sprocket 4, and provided at its opposite and lower end for connection, through a universal joint 7'. Intermediate its ends the drive shaft is of bodily spiral form, having incidental spiral loops 8, which are slightly flattened in spiral diameter, and with the magnitude of the convolutions relative to its axis gradually increasing from the lower or weeder rod connected end to the upper or sprocket connected end. Thus, for more specific understanding, it may be stated that in a drive shaft of twenty-one inches in the clear, the spiral next the weeder rod will have a diameter of two and one-half inches, and such spirals will gradually increase to a diameter of approximately four inches at the sprocket end of the shaft. The spiral form is not a true spiral, but is slightly flattened in one direction.

It is to be particularly noted that the drive shaft is in rod form from end to end, or rounded contour and of uniform diameter throughout at least that portion between the driving sprocket and the weeder rod. As a result of this form the refuse picked up by the drive shaft is lifted, and incident to the fully open spirals, the dirt and heavier refuse lifted will at once gravitate free of the drive shaft. The lighter refuse such as the straw and weeds are lifted by the spiral, fed away from the weeder rod, and moved backward and outward relative to such drive shaft to completely clear the same. The weeder rod is thus prevented from accumulating this refuse, which would seriously interfere with the weeder rod operation for weeding function.

The drive shaft will of course, be arranged to maintain the described form and operation in right or left hand drive, as some weeders are driven from the right and some from the left. A particularly important detail, in addition to the spiral formation is the use of a single rod like member of uniform diameter throughout, in which the spirals are formed, leaving the openings of the spiral completely open and free of obstruction through substantially all of the spiral-included area, so that the heavier refuse has a large and completely open space through which it may gravitate, while the rod, in its spiral length provides bars for lifting, feeding, and discharging the lighter refuse.

To insure that weeds and rubbish will not clog the gearing and in addition, cut any tangled weeds and feed the weeds away from the machine, I mount on the drive shaft 5 a concavo-convex disk 7, having its edges cut somewhat like teeth 8. The convex surface of the disk is next to the gearing, so that the edge of the concave surface teeth can act as cutters to chop and feed the weeds back and away from the machine.

The drive shaft is of a particularly important function and advantage in those areas known as wet country, and particularly in wheat country of the plains, for here the refuse straw cannot be handled by the usual weeder owing to the resulting clogging of the weeder rod, and the straw has to be first burned off, which is objectionable as permitting the soil to blow away.

No restriction is intended by the above detailed description as to the type of weeder used, or as to the length of the drive shaft or the formation of the spirals employed, so long as the drive shaft is made of a round rod, completely formed into the spirals of the relative size and relation above defined. Any and all variations, other than as above specifically identified to accommodate the particularly-formed drive shaft for use in a particular rod weeder, is contemplated.

What is claimed as new is:

1. A drive shaft for rod weeders, comprising a round rod formed completely in spiral outline, with the spirals fully open beyond the rod portion.

2. A construction as defined in claim 1, wherein the spirals increase from the driving end toward the driven end of said shaft.

3. A drive shaft for use in a rod weeder and to be interposed between a driving element and the weeder rod of said weeder, said drive shaft comprising a round rod completely formed into spiral form, with such spirals increasing in diameter and length from the end connected to the weeder rod toward the end connected to the driving element.

4. A construction as defined in claim 3, wherein the spirals are slightly flattened relative to true spiral form.

5. A drive shaft for rod weeders comprising a rounded form of substantially uniform diameter throughout, with such rod shaped to form a series of spirals in its length, with the spirals increasing in diameter and length from one end to the other of said rod.

6. A construction as defined in claim 5, wherein the spirals are slightly flattened from true spiral form.

7. A construction as defined in claim 5, wherein the spirals are slightly flattened from true spiral form, the spirals of greatest diameter being in the drive shaft remote from the weeder rod.

8. A drive shaft for rod weeders as in claim 1, provided with a toothed disk adjacent its driven end.

9. A drive shaft for rod weeders comprising a rod formed completely in spiral outline with the spiral open beyond the rod portion, and a concavo-convex disk having its peripheral edge portions formed with teeth.

JOHN F. MINTKEN.